Patented Aug. 18, 1953

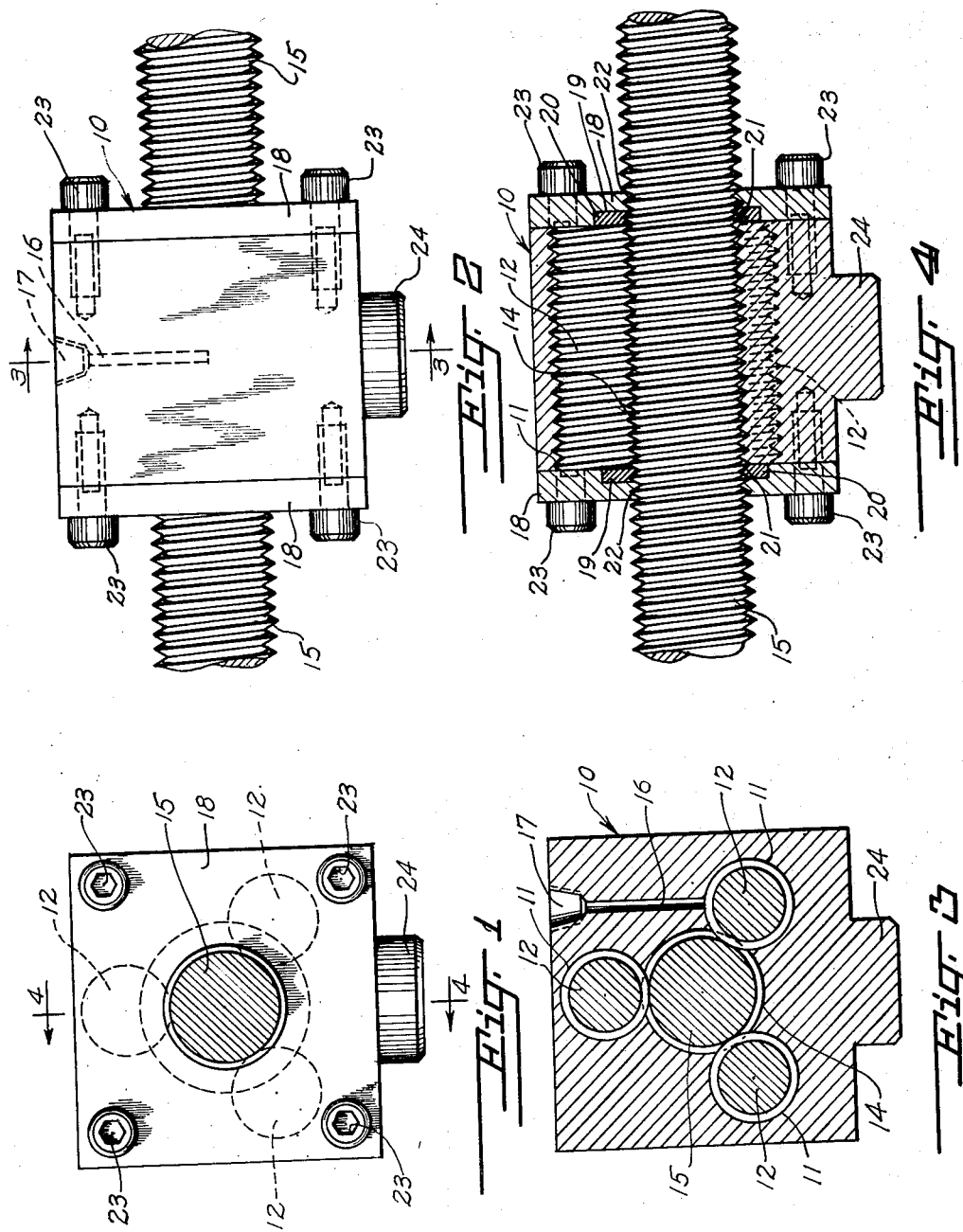

2,648,991

UNITED STATES PATENT OFFICE 2,648,991

ROLLER BEARING NUT

Howard G. Henry, Detroit, Mich.

Application August 5, 1952, Serial No. 302,788

4 Claims. (Cl. 74—424.8)

This invention relates to a frictionless roller bearing nut, and more particularly to a frictionless roller bearing nut for use on surface grinders or other machine tools.

The object of the invention is to provide a a roller bearing nut for use with the lead screw of a precision tool room surface grinder or other machine tool whereby sliding friction which is developed in an ordinary nut is eliminated or omitted so that the life of the screw and nut will be increased to thereby give the user more tool life and less down time or maintenance cost.

Another object of the invention is to provide a roller bearing nut which is constructed so that extremely accurate adjustments can be made and held over a longer period of time so as to provide the machine tool or instrument with a higher degree of precision, the present invention also enabling heavy objects to be moved with finger tip pressure, and when electric power is being used, less power will be required to thereby result in a saving on operating costs, and whereby less expensive motors will be needed.

Still another object of the invention is to provide a roller bearing nut which includes a housing in which is rotatably mounted a plurality of suitable thread type grooved rollers that may be made of any suitable material such as steel or other hard metal to provide the greatest wear life or smoothness of operation, there being a pad arranged in each end of the housing which acts as an oil sealing means and also acts as a wiper to remove away abrasive or foreign products that will tend to cause a scratched surface or undue wear.

A further object of the invention is to provide a roller bearing nut which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an end elevational view of the roller bearing nut, constructed according to the present invention;

Figure 2 is a side elevational view of the roller bearing nut;

Figure 3 is a sectional view taken on the line 3—3 of Figure 2;

Figure 4 is a sectional view taken on the line 4—4 of Figure 1.

Referring in detail to the drawings, the numeral 10 designates a housing, and the housing 10 is provided with a plurality of spaced parallel longitudinally extending bores 11, Figure 3. Rotatably arranged in each of the bores 11 is a suitable thread type grooved roller 12.

The housing 10 is further provided with a longitudinally extending passageway 14 which is adapted to rotatably receive therein a screw 15 which may be the lead screw of a precision surface grinder or other machine tool. Extending through the housing 10 and communicating with one of the bores 11 is a port 16, the port 16 including an enlarged portion 17, Figure 3. The port 16 is adapted to receive oil or other suitable lubricant whereby the moving parts will be properly lubricated.

Arranged on each end of the housing 10 and detachably connected thereto is a plate 18. The inner surface of each of the plates 18 is cutaway to define a recess 19, Figure 4, and snugly seated within each of the recesses 19 is a pad 20. Each of the pads 20 is provided with a central opening 21 which registers with an opening 22 in the plate 18, the openings 21 and 22 adapted to have projected therethrough the screw 15.

For detachably connecting the plates 18 to the housing 10, a plurality of suitable securing elements such as screws 23 are provided, the screws 23 extending through the plates 18 and into engagement with the housing 10. The housing 10 may also be provided with a locating pilot 24. It will be seen that the rollers 12 are arranged in meshing engagement with the threads on the exterior of the screw 15.

From the foregoing, it is apparent that a roller bearing nut has been provided which is frictionless and which is especially suitable for use with a precision tool room surface grinder having a lead screw, or other machine tool. The advantage of the roller bearing nut of the present invention is that little or no friction is developed in its use. As the screw 15 is revolved, the three contacting rollers 12 revolve with the screw 15. Thus, sliding friction which is developed in an ordinary nut is omitted. Also, end play is negligible since the rollers can be set metal to metal, whereas the solid nut and screw must have sliding room or the screw could not turn. Also, by eliminating sliding friction, less energy will be required to operate the instrument, so that much greater loads can be moved with much less power.

Thus, by eliminating friction there will be increased life of the screw and nut to give the user more tool life and less down time or maintenance cost. Also, setting and maintaining no end play insures that more accurate adjustments can be made and held over a longer period of time, and this results in a higher degree of precision machine tools or instruments. Also, heavy objects can be moved with finger tip pressure. Furthermore, where electric power is being used, less power will be required to thereby provide a saving of operating cost and less expensive motors can be used.

The frictionless roller bearing nut of the present invention utilizes three rollers 12 which rest in the three bores or pockets 11. The pockets 11 are bored to a size that will permit the rollers 12 to turn freely and yet not sloppy to permit any misalignment. The nut body or housing 10, housing the rollers 12, is made of a close grain iron or some such material, while the rollers are made of steel or other hard material to obtain two elements or alloys that will result in the greatest wear life or smoothness of operation.

The members 12 are suitable thread type grooved rollers. An acme type thread may be used because the flat top of this type of thread permits a good bearing surface as the rollers 12 revolve in their respective pockets or bores 11. The tapered sides of this type thread provide a better gripping action as the screw 15 is revolved the rollers 12 must revolve likewise. The pitch diameter of the screw member 15 determines the location of the pockets 11, and the pitch diameter of each of the rollers 12 must mesh properly to avoid end play and give proper action.

The end plates 18 are secured by suitable screws 23 to each end of the housing or body 10 to thereby cover the pockets 11 completely and act as end thrust plates for the rollers 12. The rollers 12 are made slightly shorter than the housing 10 so that they can turn, and the end plates 18 may be made of brass or some such metal to give the maximum wear life and freedom of friction.

Also, the end plates 18 are bored to clear the outside diameter of the screw 15, and an inner recess 19 is cut into each of the end plates 18 for holding a felt washer or pad 20. The felt washer 20 fits into the screw thread and prevents oil from leaking out. Oil enters the housing through the port 16 and since the nut is sealed at each end, this nut becomes its own oil reservoir. The felt washers 20 also act as wipers and as the screw 15 is run in and out, these wipers 20 remove any abrasive or foreign particles that will tend to cause a scratched surface or undue wear. A pilot guide member 24 may be provided on the housing 10 to help align the unit on its proper center line. However, the pilot guide member 24 is not always necessary as other means of alignment may be used in lieu thereof. The rollers 12 are equally spaced apart. In some instances, the end plates 18 may house ball bearings and such ball bearings will serve to eliminate the friction caused by the rollers 12 turning within their pockets and bearing on the thread tops. When ball bearings are used the rollers will have projecting ends which fit inside bores of each bearing so that the rollers will turn freely on ball bearings and there will be no contact between the pocket wall and roller since no contact between the pocket wall and roller will be necessary. It is to be noted that three methods of roll finishes may be used, left hand threads, right hand threads, and plain grooves spaced at intervals and formed to fit the screw being used. The preferable method will be the circular groove style. The bores in which the rollers are seated are smooth at all times, and when no bearings are used at each end of each roller, the bore surfaces act as a locater to position each screw and also the bore surfaces will be the sliding bearing for the rollers. When bearings are used on each end of each roller the bearing pocket will position each screw and the bore between the bearings is clearance and does not come in contact with the roller. Also, the center hole through which the screw enters is clearance and this bore surface does not come in contact with the screw.

I claim:

1. In a roller bearing nut, a housing, there being a plurality of equally spaced bores arranged in said housing, said housing being provided with a longitudinally extending passageway for receiving a lead screw, a roller arranged in each of said bores and provided with means for engaging with the threads on said lead screw, a plate arranged on each end of said housing, said plates having their inner surfaces cut away to define a recess, and a pad seated in each of said recesses.

2. The apparatus as described in claim 1, and further including securing elements detachably connecting said plates to the ends of said housing, there being a port arranged in said housing for the egress therethrough of a lubricant.

3. The apparatus as described in claim 1, wherein said roller bearing nut is adapted to be used on a precision tool room surface grinder or other machine tool, and a pilot arm extending from said housing to provide a guide.

4. A frictionless roller bearing nut, comprising a housing, said housing being provided with a plurality of spaced parallel bores, a roller rotatably arranged in each of said bores and extending longitudinally therethrough, there being a passageway extending longitudinally through said housing and communicating with said bores, said passageway adapted to receive a screw therein, interengaging means on said rollers and lead screw, said housing being provided with a port for supplying lubricant to the interior of said housing, a pilot guide member extending from said housing, a pair of plates mounted on the ends of said housing, and securing elements for detachably connecting said plates to said housing, the inner surface of each of said plates being cut away to define a recess, a pad seated in each of said recesses, there being registering openings in said pads and plates for the projection therethrough of said screw.

HOWARD G. HENRY.

References Cited in the file of this patent

UNITED STATES PATENTS

| Number | Name | Date |
|---|---|---|
| 2,131,151 | Smith | Sept. 27, 1938 |
| 2,144,447 | Barnhart | Jan. 17, 1939 |
| 2,321,442 | Wilson | June 8, 1943 |
| 2,525,326 | Wahlmark | Oct. 10, 1950 |